US008990546B2

(12) United States Patent
Wilson

(10) Patent No.: US 8,990,546 B2
(45) Date of Patent: Mar. 24, 2015

(54) DATA PROCESSING SYSTEM WITH SAFE CALL AND RETURN

(75) Inventor: Peter J. Wilson, Leander, TX (US)

(73) Assignee: Freescale Semiconductor, Inc., Austin, TX (US)

(*) Notice: Subject to any disclaimer, the term of this patent is extended or adjusted under 35 U.S.C. 154(b) by 676 days.

(21) Appl. No.: 13/285,434

(22) Filed: Oct. 31, 2011

(65) Prior Publication Data

US 2013/0111195 A1  May 2, 2013

(51) Int. Cl.
G06F 9/30 (2006.01)
G06F 12/02 (2006.01)
G06F 9/44 (2006.01)
G06F 12/10 (2006.01)

(52) U.S. Cl.
CPC ........... *G06F 9/30054* (2013.01); *G06F 12/02* (2013.01); *G06F 9/4421* (2013.01); *G06F 9/4425* (2013.01); *G06F 12/10* (2013.01)
USPC ........................................ 712/242

(58) Field of Classification Search
CPC ........................... G06F 9/30054; G06F 9/4421
USPC ........................................ 712/242
See application file for complete search history.

(56) References Cited

U.S. PATENT DOCUMENTS

| 4,558,176 | A | 12/1985 | Arnold et al. |
| 5,864,707 | A | 1/1999 | Tran et al. |
| 5,881,278 | A | 3/1999 | Tran et al. |
| 5,890,189 | A * | 3/1999 | Nozue et al. ................ 711/100 |
| 5,949,973 | A | 9/1999 | Yarom |
| 5,968,169 | A | 10/1999 | Pickett |
| 6,070,198 | A | 5/2000 | Krause et al. |
| 6,269,436 | B1 | 7/2001 | Tran et al. |
| 6,301,699 | B1 | 10/2001 | Hollander et al. |
| 6,578,094 | B1 | 6/2003 | Moudgill |
| 6,618,797 | B1 | 9/2003 | Dery et al. |
| 6,766,513 | B2 | 7/2004 | Charnell et al. |
| 6,769,004 | B2 | 7/2004 | Barrett |
| 6,941,473 | B2 | 9/2005 | Etoh et al. |
| 6,996,677 | B2 | 2/2006 | Lee et al. |
| 7,165,150 | B2 | 1/2007 | Alverson et al. |
| 7,178,010 | B2 | 2/2007 | McDonald |

(Continued)

OTHER PUBLICATIONS

Baratloo et al.; "Transparent Run-Time-Defense Against Stack Smashing Attacks"; Proceedings of 2000 USENIX Annual Technical Conference; Jun. 12-18, 2000; 13 Pgs.; The USENIX Association.

(Continued)

*Primary Examiner* — Andrew Caldwell
*Assistant Examiner* — Benjamin Geib
(74) *Attorney, Agent, or Firm* — Joanna G. Chiu; Mary Jo Bertani

(57) ABSTRACT

Embodiments of a system and method are disclosed that can include a memory unit, and a memory management unit coupled to the memory unit. The memory management unit can include address mapping circuitry and access control circuitry operable to: provide address mappings for at least a frame stack and a link stack in the memory unit for programs being executed by the processing unit, and provide an access permission indicator applicable to any segment of the memory unit. A processing unit can save context information for a program to the frame stack, and execute a savelink instruction subsequent to the execution of a branch and link instruction. If the access permission indicator is set, the savelink instruction saves to the link stack a return address provided by the branch and link instruction.

20 Claims, 6 Drawing Sheets

(56) References Cited

U.S. PATENT DOCUMENTS

| | | | |
|---|---|---|---|
| 7,251,735 B2 | 7/2007 | Howard | |
| 7,424,596 B2 | 9/2008 | Wu et al. | |
| 7,467,272 B2 | 12/2008 | Genty et al. | |
| 7,581,089 B1 * | 8/2009 | White | 712/242 |
| 7,660,985 B2 | 2/2010 | Asher et al. | |
| 7,669,243 B2 | 2/2010 | Conti | |
| 7,673,345 B2 | 3/2010 | Cheng et al. | |
| 7,752,459 B2 | 7/2010 | Cowan et al. | |
| 7,853,803 B2 | 12/2010 | Milliken | |
| 2003/0177328 A1 | 9/2003 | Naganuma et al. | |
| 2004/0168078 A1 | 8/2004 | Brodley et al. | |
| 2005/0044292 A1 | 2/2005 | McKeen | |
| 2005/0138263 A1 | 6/2005 | McKeen | |
| 2006/0294346 A1 | 12/2006 | Stempel et al. | |

OTHER PUBLICATIONS

Avanzato; "Bypassing Stackguard and Stackshield"; Phrack Magazine; May 1, 2000; pp. 1-8; vol. 0xa, Issue 0x38; Bulba and Kil3R (lam3rz@hert.org).

Hsu; "RAD: A Compile-Time Solution to Buffer Overflow Attacks"; Jul. 23, 2000; 20 Pgs.; Department of Computer Science, State University of New York at Stony Brook.

One; "Smashing The Stack For Fun And Profit"; Phrack Magazine; Aug. 11, 1996; Pgs.; vol. 7, Issue 49; Phrack Magazine.

Cowan et al.; "Protecting Systems from Stack Smashing Attacks with StackGuard"; 1999; 11 Pgs.; Department of Computer Science and Engineering, Oregon Graduate Institute of Science and Technology.

Sinnadurai et al.; "Transparent Runtime Shadow Stack: Protection against malicious return address modifications"; 2011; 11 Pgs.; Penn State.

Frantzen et al.; "StackGhost: Hardware Facilitated Stack Protection"; www.stackghost.cerias.purdue.edu; 2011; 11 Pgs; Purdue University.

Dildog; "The Tao of Windows Buffer Overflow"; 15 Pgs.; www.cultdeadcow.com.

"Buffer Overflow Protection"; Wilipedia; Downoaded Nov. 8, 2011; 6 Pgs.; http://en.wikipedia.org/wiki/Buffer_overflow_protection.

* cited by examiner

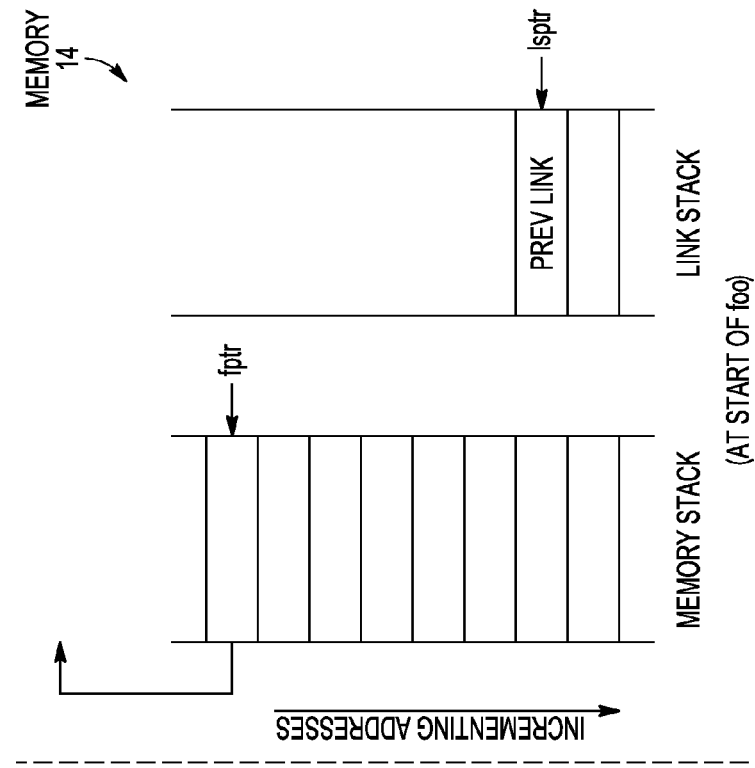

DATA PROCESSING SYSTEM WITH SAFE CALL AND RETURN

BACKGROUND

1. Field

This disclosure relates generally to data processing systems, and more specifically, to data processing systems having safe call and return operations.

2. Related Art

In typical data processing systems, a frame stack keeps tracks of procedures called within an executable program. For example, for a called procedure, a frame can be created and placed on a frame stack in memory. This frame may include the local variables of the procedure (which have, for example, overflowed from the registers) as well as the return address to return execution to the caller. However, it is possible that errant software can perform a write to the frame stack causing the return address to be overwritten, thus resulting in the program returning to malevolent code rather than the desired return point. This type of attack may be referred to as a "buffer overflow" attack or a "stack smashing attack". Therefore, a need exists for improved safety within a data processing system to prevent such attacks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates high level pseudocode for an exemplary subroutine "foo".

FIG. 5 illustrates an exemplary call to subroutine "foo" and an exemplary compiled instance of subroutine foo using processor instructions.

FIGS. 6-8 illustrate, in diagrammatic form, portions of memory 14 at various points during execution of the subroutine foo of FIG. 5.

DETAILED DESCRIPTION

In one embodiment, return links (i.e. return addresses) from a subroutine are not stored in the frame stack in memory, but are instead stored in a separate link stack. In this manner, the return links are not stored in the frame of a subroutine which stores the arguments which have overflowed from the registers and other local variables of the function. This way, errant software which performs a write to the frame stack cannot overwrite the return link since it does not reside in the frame stack. Furthermore, a stack attribute may be added to the page attributes for the address mapping circuitry such that access to the link stack can be controlled.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
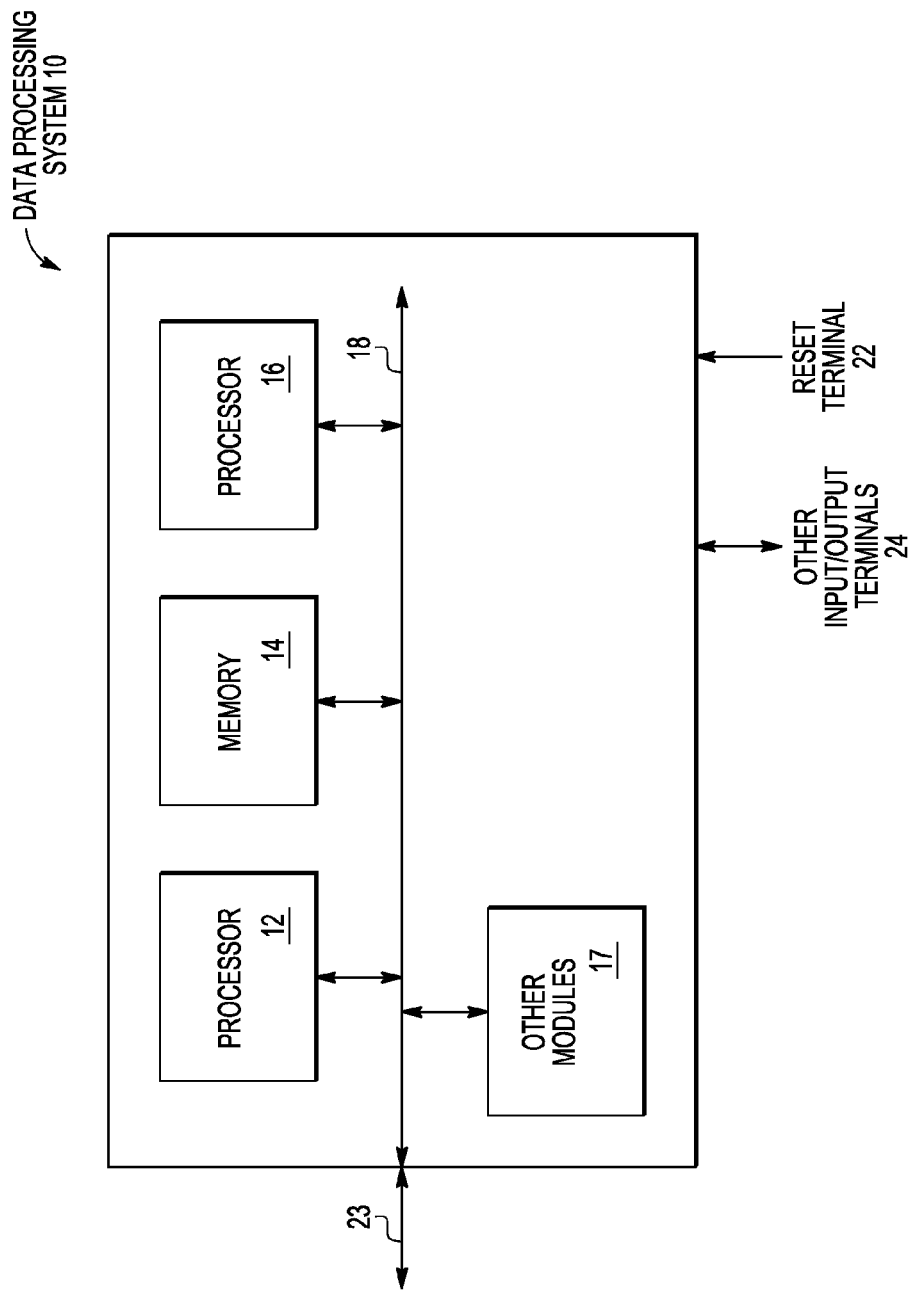
FIG. 1 illustrates, in block diagram form, a data processing system in accordance with an embodiment of the present invention.

FIG. 1 illustrates a data processing system 10 in accordance with one embodiment of the present invention. In the illustrated embodiment, data processing system 10 has a processor 12, a memory 14, a processor 16, and other modules 17 which are all bi-directionally coupled by way of a bus 18. Alternate embodiments of the present invention may use more, fewer, or different functional blocks that those illustrated in FIG. 1. In one embodiment, system 10 may be a computer system. As some possible examples, alternate embodiments of data processing system 10 may include a timer, a serial peripheral interface, a digital-to-analog converter, an analog-to-digital converter, a driver, or a plurality of types of memory. Also, bus 18 may communicate external to data processing system 10 by way of one or more terminals 23. Bus 18 may be implemented in a variety of ways, such as by a cross bar switch or interconnect fabric.

One or more functional blocks of data processing system 10 (e.g. functional blocks 12, 14, 16, 17) may communicate external to data processing system 10 by way of one or more other input/output terminals 24. Some of these terminals 24 may be input only, some may be output only, and some may be both input and output. Alternate embodiments may not even use other input/output terminals 24. In the illustrated embodiment, data processing system 10 has a reset terminal 22 which is used to receive an externally provided reset signal and to place data processing system 10 into a reset state as a result. Note that some embodiments of data processing system 10 may also be able to place data processing system in a reset state in response to one or more internally generated signals. Processor 12 and/or processor 16 may begin to execute instructions once data processing system 10 exits from a reset state.

In alternate embodiments, data processing system 10 may include one, two, or any number of processors 12, 16. If a plurality of processors 12, 16 are used in data processing system 10, any number of them may be the same, or may be different. Note that although data processing system 10 may have a plurality of processors 12, 16, the descriptions provided herein will be made in reference to processor 12.

Figure 2:
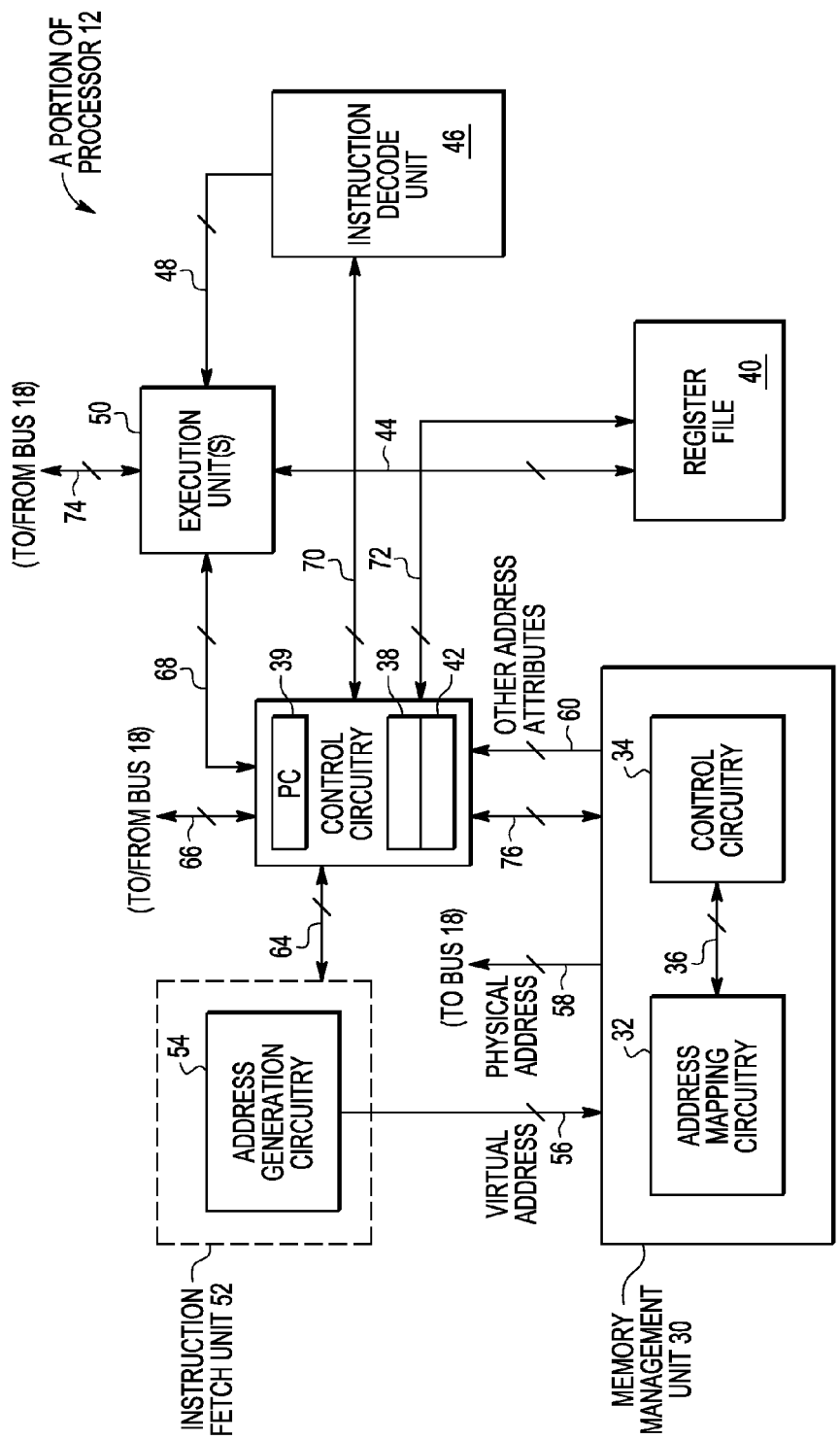
FIG. 2 illustrates, in block diagram form, a portion of processor 12 of FIG. 1 in accordance with an embodiment of the present invention.

FIG. 2 illustrates one embodiment of a portion of processor 12 of FIG. 1. Alternate embodiments of processor 12 may use more, less, or different functional blocks that those illustrated in FIG. 2. In the illustrated embodiment, processor 12 has an instruction fetch unit 52 which includes address generation circuitry 54 to generate addresses, along with other circuitry used to perform instruction fetch operations. In one embodiment, address generation circuitry 54 is coupled to memory management unit (MMU) 30 by way of conductor 56 which communicates a virtual address. Memory management unit 30 includes address mapping circuitry 32 and control circuitry 34 which are bi-directionally coupled by way of conductors 36.

Based on virtual address 56 that MMU 30 receives, MMU 30 provides the corresponding physical address to bus 18 by way of conductors 58. Also, based on virtual address 56 that MMU 30 receives, MMU 30 provides the corresponding values of the other address attributes to control circuitry 62 by way of one or more conductors 60. In the illustrated embodiment, MMU 30 is bi-directionally coupled to control circuitry 62 by way of one or more conductors 76 in order to communicate control and status information. Control circuitry 62 includes PC counter 39 and storage circuitries 38 and 42

Register file 40 is bidirectionally coupled to execution unit(s) 50 by way of one or more conductors 44 and is bidirectionally coupled to control circuitry 62 by way of one or more conductors 72. In one embodiment, instruction decode unit 46 is bidirectionally coupled to control circuitry 62 by way of conductors 70. Instruction decode unit 46 is also coupled to execution unit(s) 50 to provide control signals by way of one or more conductors 48 for use in controlling execution unit(s) 50. Note that in some embodiments, control circuitry 62 may be bi-directionally coupled to execution unit(s) 50 by way of conductors 68 in order to communicate control and status information. Alternate embodiments of the present invention may not use conductors 68, but may instead provide all control signals to execution unit(s) 50 by way of instruction decode unit 46. Note that alternate embodiments of the present invention may implement the blocks and functionality of the circuitry illustrated in FIG. 2 in any desired manner. The portion of processor 12 illustrated in FIG. 2 was merely intended as one possible example of circuitry that may be used. Many alternate embodiments are possible.

In operation, instruction fetch unit 52 generates instruction addresses which are used to fetch instructions to be decoded by instruction decode unit 46 and executed by execution unit(s) 50, accessing register file 40 as needed. In one embodiment, the fetched instructions may be stored in an instruction buffer which may be included within instruction decode unit 46 or control circuitry 62. In one embodiment, instruction fetch unit 52 provides a virtual address to MMU 30. Address mapping circuitry 32 receives this virtual address and compares at least a portion of this received virtual address to the virtual page addresses (as will be seen in FIG. 3) in order to select an entry which has a matching virtual page address. Page attributes from the selected entry (e.g. read, write, execute, endianness, cacheability, security, stack, etc.) are provided to control circuitry 62 and may be used by control circuitry 62 during execution of instructions fetched from the corresponding page. Also, a physical page address from the selected entry is provided to bus 18 by way of conductors 58. Note that in some embodiments of the present invention, the complete physical address provided on conductors 58 is a concatenation of a portion of virtual address 56 and the physical page address. Alternate embodiments may directly map all or a portion of virtual address 56 to be the complete physical address 58 without any address translation being required. The complete physical address provided by way of conductors 58 is used to fetch the instruction residing at that address from memory 14. These fetched instructions can then be decoded and executed, as described above, in accordance with the corresponding page attributes.

Figure 3:
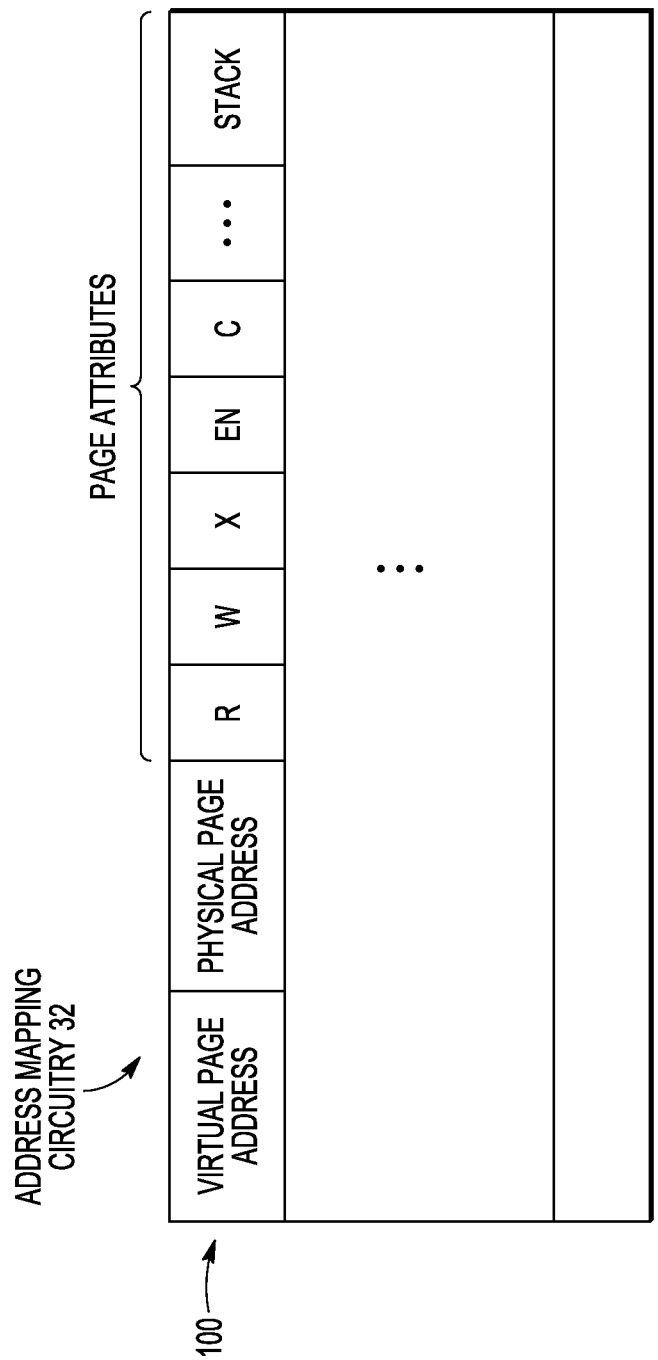
FIG. 3 illustrates, in block diagram form, address mapping circuitry 32 of FIG. 2 in accordance with an embodiment of the present invention.

FIG. 3 illustrates address mapping circuitry 32 in accordance with one embodiment of the present invention. Address mapping circuitry 32 includes a plurality of entries, such as entry 100. Each entry includes a virtual page address, a corresponding physical page address, and corresponding page attributes. The size of the page may be fixed, or may be specified by a further field in the entry. An entry therefore specifies a page with a starting virtual address and a size. The page attributes may include a read (R) attribute, a write (W) attribute, an execute (X) attribute, an endianness (EN) attribute, a cacheable (C) attribute, and a stack attribute. Some examples of other address attributes which may be included in the page attributes are attributes related to security, memory coherence, cache inhibition, write-through operation, etc. Therefore, as described with respect to FIG. 2 above, a virtual address is provided to address mapping circuitry 32 and an entry is selected whose page contains the received virtual address. The physical page address is provided from the entry to bus 18 (or may be concatenated with the virtual page address and provided to bus 18) and the corresponding page attributes are provided to control circuitry 62. In one embodiment, the provided page attributes are attributes which apply to the page in memory 14 which corresponds to the physical page address of the entry. Therefore, address mapping circuitry 32 may, in one embodiment, include an entry for each page in memory 14. The R attribute may indicate whether or not a read access may be performed to the page, a W attribute may indicate whether or not a write access may be performed to the page, an X attribute may indicate whether or not an instruction from that page can be executed, an EN attribute may indicate the endianness of the information stored in the page, and a C attribute may indicate whether the page is cacheable or not. In one embodiment, the stack attribute is used to indicate whether or not particular link stack instructions have permission to access the corresponding page. For example, a page of memory which has only has this stack attribute asserted can only be written to or read from by the particular link stack instructions, which will be described below. If a page of memory does not have this stack attribute asserted, then it cannot be written to or read from by the particular link stack instructions. Although address mapping circuitry 32 has been described in reference to pages in memory 14, address mapping circuitry 32 may provide page attributes (e.g. access permission indicators) for any segment of memory 14.

FIG. 4 illustrates high level pseudocode for an exemplary subroutine "foo". Subroutine foo receives two integer values (a and b) and returns an integer value. Subroutine foo defines local integer arguments p, q, and r, includes one or more computations which may use any one or more of arguments a, b, p, q, and r, and returns p as the return integer value of the subroutine.

FIG. 5 illustrates an exemplary call to subroutine "foo" and an exemplary compiled instance of subroutine foo using processor instructions. Upon a call to subroutine foo, a branch and link (blnk) instruction to subroutine foo is executed. This blnk instruction stores the current PC value to register R31 (within register file 40), and stores the address of the foo subroutine to PC counter 39. In this manner, program execution will continue at address location "foo". As illustrated in FIG. 5, subroutine foo begins at label "foo:" with instruction savelink R31. Note that execution of subroutine foo will be described in reference to FIGS. 6-8 which show portions of memory 14 which represent the frame stack for subroutines and a separate link stack which is not accessible by way of the frame stack. That is, the link stack is located in a separate memory region from the frame stack in which frames are stored and stores the return links (i.e. return addresses) for subroutines. Because the link stack is separate from the frame stack, return links addresses cannot be modified or overwritten by accessing the frame stack. Note that storage circuitry 38 in control circuitry 62 may be used to store the fptr and storage circuitry 42 in control circuitry 62 may be used to store the lsptr. That is, the frame stack and link stack are in separate regions of memory 14 and are separately maintained by controlling independent pointers fptr and lsptr.

Referring to FIG. 6, at the start of "foo", before the first instruction savelink R31 is executed, the frame pointer (fptr) of the frame stack is pointing to a location in the frame stack, and the link stack pointer (lsptr) is still pointing to the previous return link (prev link).

Figure 7:
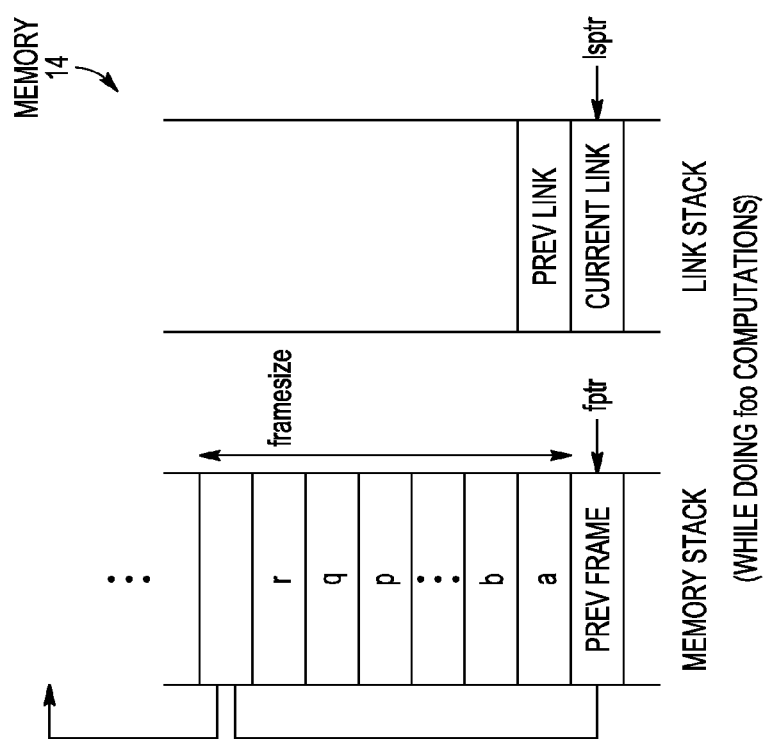

Referring back to the code of FIG. 5, the savelink R31 instruction stores the value of R31 (which represents the return address for subroutine foo, i.e. the PC value which was previously saved to R31 as a result of the execution of "bink foo") to the link stack. As illustrated in FIG. 7, this may be done by incrementing the lsptr by an appropriate value and storing the current link (the return address for subroutine foo) at the new location pointed to by lsptr. FIG. 7 also illustrates the frame stack during execution of the computations of subroutine foo. After the savelink instruction, a store (stw) instruction is executed which stores the value of "fptr+framesize" to the fptr. That is, the stw instruction advances the fptr by the amount "framesize" to create a new frame for the current subroutine foo. This frame will be used to store the variables which are used during the computations of the foo subroutine. For example, as illustrated in FIG. 7, these variables are stored in the current frame of the frame stack include a, b, . . . , p, q, and r. Therefore, any variables which overflow from the registers in register file 40 during execution of foo (while doing the computations of foo) are stored in the frame stack in the current frame indicated by fptr and framesize. Also, at the location pointed to by fptr, the frame pointer for the previous frame is stored so that the previous frame in the frame stack may be returned to upon completion of foo. The register values (such as the variables which overflow from the registers in register file 40) during execution of foo and the frame pointer values (such as the previous frame pointer) may be referred to as the context information for the foo subroutine.

Figure 8:
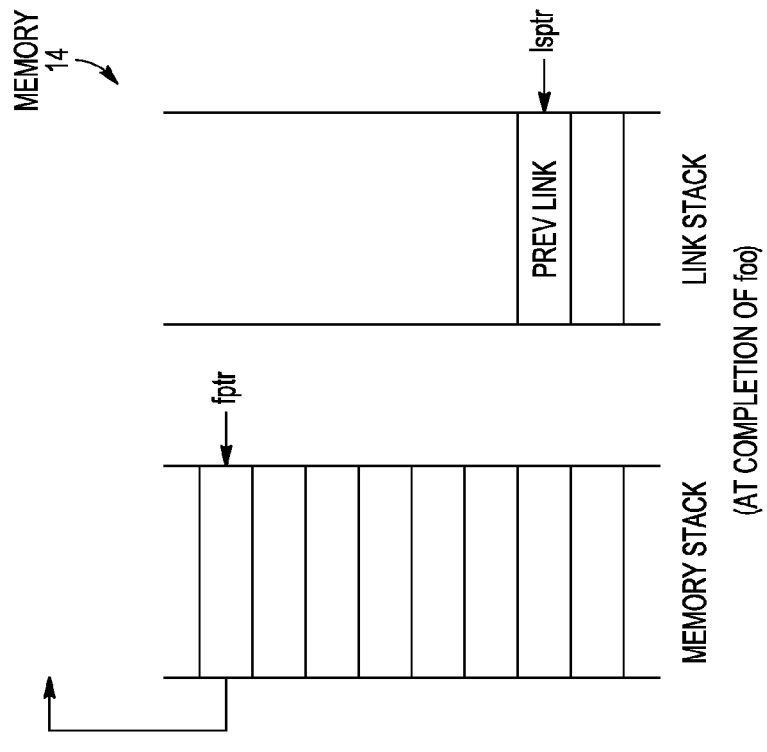

FIG. 8 illustrates the frame stack and link stack after completion of subroutine foo. After completion of the foo computations, a load (ldw) instruction is executed to load the value pointed to by fptr (with a 0 offset), back to fptr. In this manner, fptr again points to the previous frame. After the ldw instruction, the getlink instruction is executed which restores the previous link. For example, execution of the getlink instruction may result in restoring the current link (i.e. the return address for foo) and decrementing the lsptr by the appropriate value such that the lsptr is again pointing to the previous link. Note that the current link from the link stack is used to update the PC such that program execution can return to where it was before executing foo. For example, the current link may be incremented and stored as the new PC value such that execution can continue at the instruction which follows the call to subroutine foo.

Therefore, by keeping the return links (return addresses) in a separate stack maintained by the lsptr, any corruption of the frame stack does not result in overwriting any return addresses. In this manner, processor 12 is protected from a stack smashing attack. In order to further protect processor 12 from a stack smashing attack, an extra access attribute (e.g. the stack attribute illustrated in FIG. 3) may be provided for memory 14. A segment of memory 14 which has only stack access (in which the stack attribute is asserted) may only be written to or read from by the savelink and getlink instructions. In this case, the use of ordinary loads and stores will results in an access failure exception. Note that, in one embodiment, use of the savelink and getlink instructions to access a memory segment of memory 14 whose stack attribute is not asserted also results in an exception. In this manner, the ability to overwrite the return addresses is greatly reduced or prevented altogether.

Figure 9:
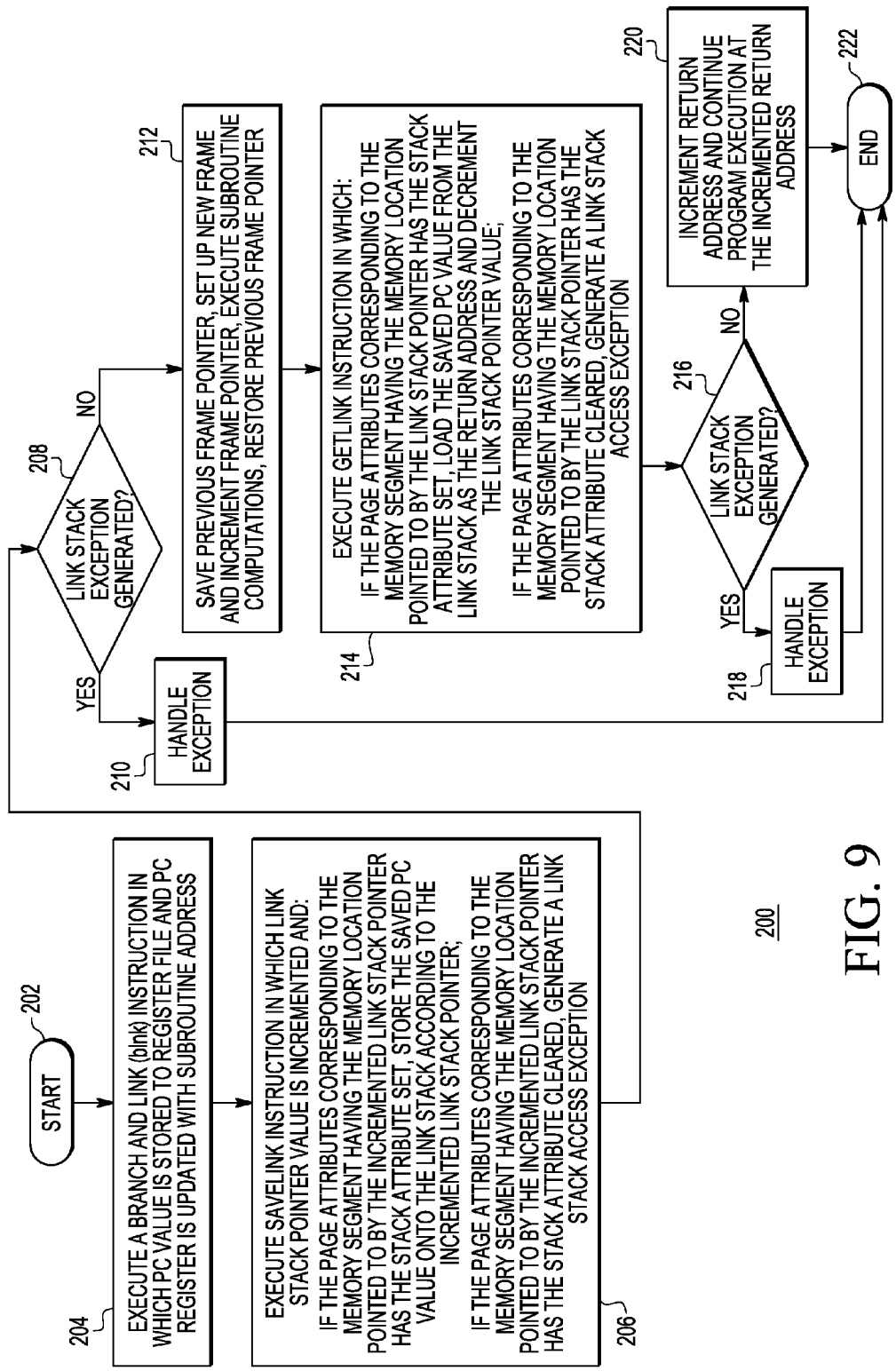
FIG. 9 illustrates, in flow diagram form, a method of performing a safe call to and return from a subroutine, in accordance with an embodiment of the present invention.

FIG. 9 illustrates, in flow diagram form, a method 200 of performing a safe call to and return from a subroutine, in accordance with an embodiment of the present invention. Method 200 begins at start 202 and flow proceeds to block 204 in which a branch and link (blnk) instruction is executed in which the PC value is stored to the register file and the PC register is updated with the subroutine address. An example of this was described above in reference to the blnk instruction to call subroutine foo in FIG. 6.

Flow then proceeds to block 206 in which a savelink instruction is executed in which the link stack pointer value (e.g. lsptr) is incremented and if the page attributes corresponding to the memory segment having the memory location pointed to by the incremented link stack pointer has the stack attribute set (i.e. asserted), then the saved PC value is stored onto the link stack according to the incremented link stack pointer. However, if the page attributes corresponding to the memory segment having the memory location pointed to by the incremented link stack pointer has the stack attribute cleared (i.e. not asserted), a link stack access exception is generated. For example, referring to FIGS. 6 and 7, the location in the link stack pointed to by the incremented lsptr should have its stack attribute asserted, otherwise a link stack pointer exception would result. Also, note that the saved PC value which is stored at the location pointed to by the incremented lsptr corresponds to the "current link" (i.e. the return address for the current subroutine).

After block 206, method 200 proceeds to decision diamond 208 in which it is determined whether or not a link stack exception was generated as a result of executing the savelink instruction. If so, flow proceeds to block 210 in which the exception is handled, and method 200 ends at end 222. However, if not, flow proceeds to block 212, in which the previous frame pointer is saved, a new frame is set up and the frame pointer is incremented (such as by the value "framesize" representing the size of the current frame), the subroutine computations are executed, and the previous frame pointer is then restored. An example of this was described above in reference to FIG. 6 and the frame stack of FIG. 7 in which a current frame was set up for subroutine foo.

After block 212, flow proceeds to block 214 in which a getlink instruction is executed in which if the page attributes corresponding to the memory segment having the memory location pointed to by the link stack pointer (e.g. lsptr) has the stack attribute set (i.e. asserted), then the saved PC value is loaded from the link stack as the return address and the link stack pointer value is decremented. However, if the page attributes corresponding to the memory segment having the memory location pointed to by the link stack pointer has the stack attribute cleared (i.e. not asserted), a link stack access exception is generated. For example, referring to FIGS. 6 and 8, the location in the link stack pointed to by lsptr (prior to decrementing) should have its stack attribute asserted, otherwise a link stack access exception would result. Also, note that the saved PC address loaded from the link stack is used as the return address so that program flow returns to the appropriate location.

After block 214, flow proceeds to decision diamond 216 in which it is determined whether or not a link stack exception was generated. If so, flow proceeds to block 218 in which the exception is handled, and method 200 ends at end 222. If not, flow proceeds to decision diamond 220 in which the return address is incremented and program execution can continue at the incremented return address (which would correspond to the instruction following the subroutine call).

Note that, in method 200 of FIG. 9, the stack attribute corresponds to a segment of memory 14. In one example, each segment of memory corresponds to a page of memory in which the stack attribute is provided as one of the page attributes. However, in alternate embodiments, the segments of memory having a stack attribute may be larger or smaller than a page of memory, and may not directly relate to the pages in memory. In this case, separate storage or a separate lookup table may be used to provide the stack attributes for each segment of memory.

Therefore, the use of a link stack separate from the frame stack which stores the frames, control information (return addresses) is separated from normal data used when executing a subroutine. Furthermore, a memory access attribute, such as the stack attribute, may be used to offer additional protection for the link stack. The example provided above in FIGS. 4-9 uses the frame stack to store context information of the subroutine (e.g. arguments of a subroutine and the previous frame pointer) and the link stack to store return links. However, the link stack and stack attributes may be used in any case in which executing an instruction transfers program execution to instructions which are not contiguous with instructions currently being executed. In this case, the context information upon executing the instruction which transfers the program execution, context information generated during the execution of the instructions to which program execution was transferred can be stored There may be other scenarios in which it is desirable to separate control information from normal data. For example, some higher level programming languages, such as C, allow for a longjump which supports a simple form of non-local goto's. This longjump is typically in user mode and its data structures can be at risk.

As an example of how a further safe separation of control and data may be explained, a longjump (i.e. longjmp) operation may be implemented making use of the link stack previously described. A classic longjump operation includes a setjmp operation and possibly a subsequent corresponding longjmp. The setjmp operation stores the current environment of the processor in a buffer in the frame stack. This environment may contain the current values of the registers including the PC, the frame pointer (fptr), etc. Execution of a subsequent longjmp operation specifying the address of such a buffer will restore the processor to the state saved in the buffer. The buffer naturally contains the value of the PC at the setjmp operation, and thus is prone to buffer overwrite attacks. To protect longjmp operations from such attacks, processor 12 (i.e. a processing unit) may save key elements of the environment (e.g. key context information, including at least one frame pointer and one register value) onto the link stack, and save the value of the link stack pointer into the environment buffer. When executing a longjmp, the saved value of the link stack pointer is retrieved, the link stack address thereby specified is checked as having the stack attribute (as was described above in reference to the stack attribute in address mapping circuitry 32), and then is read to confirm that it contains the address just read from the frame stack. The other information that can be saved to the link stack as context information on a setjmp, and used in a corresponding longjmp, may include the address of the frame pointer (fptr) to be used and the address to be branched to upon executing the longjmp. Upon executing the longjmp, the link stack pointer is retrieved as described, and then the saved values of destination address and frame pointer are used to recover the remainder of the environment and to branch to the specified location. Some further instructions may be specified to ease managing these data structures.

Therefore, in one embodiment, such as in the longjump example, system 10 includes a memory unit 14, a memory management unit 30 coupled to memory unit 14, wherein memory management unit 30 includes address mapping circuitry 32 and access control circuitry 34 operable to provide address mappings for at least a frame stack and a link stack in memory unit 14 for programs being executed by processing unit 12, and wherein a mapping provides a stack segment attribute indicator (i.e. a stack attribute indicator) application to any segment of memory unit 14. System 10 also includes processing unit 12 operable to save context information for a program to the link stack if the stack segment attribute indicator is set, wherein the context information (i.e. environment information) includes values of at least a frame pointer and one register value.

In one embodiment, system 10 described in the previous paragraph may further include that if a page address entry corresponding to a link stack memory segment pointed to by a link stack pointer has the stack segment attributed indicator cleared, the processor generates a link stack access exception (as described, for example, in block 206). In a further embodiment, system 10 may further include that if the link stack access exception was not generated, the processing unit may save a previous frame pointer, set up a new frame, increment the frame pointer, execute instructions to which program execution was transferred; and upon encountering instructions requesting a transfer to a prior context, restore the requested context.

In another embodiment, system 10 described in the paragraph before the previous paragraph may further be operable to, if a page address entry corresponding to the link stack having a memory location pointed to by a link stack pointer value has the stack attribute set, a stored value from the link stack is loaded as a return address and an incremented link stack pointer value is decremented (as described, for example, in block 214). In a further embodiment, system 10 may further include that if a page address entry corresponding to the link stack pointed to by the link stack pointer has the stack attribute cleared, the processing unit is further operable to generate a link stack access exception (as descried, for example, in block 214).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 14 may be located on a same integrated circuit as processors 12 and 16 or on a separate integrated circuit or located within another peripheral or slave discretely separate from other elements of system 10.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 14 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a system including a memory unit; a memory management unit coupled to the memory unit, wherein the memory management unit includes address mapping circuitry and access control circuitry operable to provide address mappings for at least a frame stack and a link stack in the memory unit for programs being executed by the processing unit, and provide an access permission indicator applicable to any segment of the memory unit; and a processing unit operable to save context information for a program to the frame stack, and execute a savelink instruction subsequent to the execution of a branch and link instruction, wherein if the access permission indicator is set, the savelink instruction saves to the link stack a return address provided by the branch and link instruction. Item 2 includes the system of item 1, wherein the processing unit is further operable to execute a getlink instruction that restores from the link stack the return address to the program that invoked the branch and link instruction. Item 3 includes the system of item 2, wherein memory segments which have the access permission indicator set can only be accessed using the savelink and getlink instructions. Item 4 includes the system of item 2, wherein memory segments which do not have the access permission indicator set cannot be accessed using the savelink and getlink instructions. Item 5 includes the system of item 1, wherein the savelink instruction increments a link stack pointer; and if a page address entry corresponding to the link stack pointed to by an incremented link stack pointer has the access permission indicator cleared, the processing unit generates a link stack access exception. Item 6 includes the system of item 5, and further includes if the link stack access exception was not generated, the processing unit: saves a previous frame pointer, sets up a new frame, increments a frame pointer, executes processing instructions indicated by the branch and link instruction, and restores the previous frame pointer. Item 7 includes the system of item 5, wherein the processing unit is further operable to execute a getlink instruction that restores from the link stack the return address to the program that invoked the branch and link instruction; and if the page address entry corresponding to the link stack having a memory location pointed to by the link stack pointer has the access permission indicator set, the getlink instruction loads the stored program counter value from the link stack as the return address and decrements the incremented link stack pointer. Item 8 includes the system of item 7, and further includes if the page address entry corresponding to the link stack pointed to by the link stack pointer has the access permission indicator cleared, the savelink instruction generates the link stack access exception. Item 9 includes the system of item 8, wherein the processing unit is further operable to: if the link stack access exception is not generated, the getlink instruction increments a return address and the processing unit continues program execution at the incremented return address.

Item 10 includes a method including, in a system including a register file: allocating a link stack memory segment for storing a link stack; executing a branch and link instruction in which a program counter (PC) value is stored to the register file; executing a savelink instruction in which a link stack pointer value to the link stack memory segment is incremented; and if page attributes corresponding to the link stack memory segment having a memory location pointed to by the incremented link stack pointer has a stack attribute set, storing the PC value from the register file in the link stack memory segment. Item 11 includes the method of item 10 and further includes if page attributes corresponding to the link stack memory segment pointed to by the incremented link stack pointer has the stack attribute cleared, generating a link stack access exception. Item 12 includes the method of item 11 and further includes if the link stack access exception was not generated: saving a previous frame pointer; setting up a new frame; incrementing a frame pointer; executing processing instructions indicated by the branch and link instruction; and restoring the previous frame pointer. Item 13 includes the method of item 10 and further includes executing a getlink instruction in which: if the page attributes corresponding to the link stack memory segment having the memory location pointed to by the link stack pointer value has the stack attribute set, the stored PC value from the link stack is loaded as the return address and the incremented link stack pointer value is decremented. Item 14 includes the method of item 13 and further includes if page attributes corresponding to the link stack memory segment pointed to by the link stack pointer has the stack attribute cleared, generating a link stack access exception. Item 15 includes the method of item 14 and further includes if the link stack access exception is not generated, incrementing a return address and continuing program execution at the incremented return address.

What is claimed is:

1. A method comprising:
   in a system including a register file:
   allocating a link stack memory segment for storing a link stack;
   executing a branch and link instruction in which a program counter (PC) value is stored to the register file;
   executing a savelink instruction in which a link stack pointer value to the link stack memory segment is incremented; and
   if page attributes corresponding to the link stack memory segment having a memory location pointed to by the incremented link stack pointer has a stack attribute set, storing the PC value from the register file in the link stack memory segment.

2. The method of claim 1 further comprising:
   if page attributes corresponding to the link stack memory segment pointed to by the incremented link stack pointer has the stack attribute cleared, generating a link stack access exception.

3. The method of claim 2 further comprising:
   if the link stack access exception was not generated:
   saving a previous frame pointer;
   setting up a new frame;
   incrementing a frame pointer;
   executing processing instructions indicated by the branch and link instruction; and
   restoring the previous frame pointer.

4. The method of claim 1 further comprising:
   executing a getlink instruction in which:
   if the page attributes corresponding to the link stack memory segment having the memory location pointed to by the link stack pointer value has the stack attribute set, the stored PC value from the link stack is loaded as the return address and the incremented link stack pointer value is decremented.

5. The method of claim 4 further comprising:
   if page attributes corresponding to the link stack memory segment pointed to by the link stack pointer has the stack attribute cleared, generating a link stack access exception.

6. The method of claim 5 further comprising:
   if the link stack access exception is not generated, incrementing a return address and continuing program execution at the incremented return address.

7. A system comprising:
   a memory unit;
   a memory management unit coupled to the memory unit, wherein the memory management unit includes address mapping circuitry and access control circuitry operable to:
   provide address mappings for at least a frame stack and a link stack in the memory unit for programs being executed by the processing unit, and
   provide an access permission indicator applicable to any segment of the memory unit; and
   a processing unit operable to:
   save context information for a program to the frame stack, and execute a savelink instruction subsequent to the execution of a branch and link instruction, wherein if the access permission indicator is set, the savelink instruction saves to the link stack a return address provided by the branch and link instruction; and execute a getlink instruction that restores from the link stack the return address to the program that invoked the branch and link instruction, wherein memory segments which have the access permission indicator set can only be accessed using the savelink and getlink instructions.

8. The system of claim 1 further comprising:

memory segments which do not have the access permission indicator set cannot be accessed using the savelink and getlink instructions.

9. The system of claim 1 further comprising:

the savelink instruction increments a link stack pointer;

if a page address entry corresponding to the link stack pointed to by an incremented link stack pointer has the access permission indicator cleared, the processing unit generates a link stack access exception.

10. The system of claim 9 further comprising:

if the link stack access exception was not generated, the processing unit:

saves a previous frame pointer, sets up a new frame, increments a frame pointer, executes processing instructions indicated by the branch and link instruction, and restores the previous frame pointer.

11. The system of claim 9 wherein the processing unit is further operable to:

execute a getlink instruction that restores from the link stack the return address to the program that invoked the branch and link instruction;

if the page address entry corresponding to the link stack having a memory location pointed to by the link stack pointer has the access permission indicator set, the getlink instruction loads the stored program counter value from the link stack as the return address and decrements the incremented link stack pointer.

12. The system of claim 11 further comprising:

if the page address entry corresponding to the link stack pointed to by the link stack pointer has the access permission indicator cleared, the savelink instruction generates the link stack access exception.

13. The system of claim 12 wherein the processing unit is further operable to:

if the link stack access exception is not generated, the getlink instruction increments a return address and the processing unit continues program execution at the incremented return address.

14. A system comprising:

a memory unit;

a memory management unit coupled to the memory unit, wherein the memory management unit includes address mapping circuitry and access control circuitry operable to:

provide address mappings for at least a frame stack and a link stack in the memory unit for programs being executed by the processing unit, and wherein a mapping provides a stack segment attribute indicator applicable to any segment of the memory unit; and a processing unit operable to:

save a first portion of context information for a program to the link stack if the stack segment attribute indicator is set, save a second portion of the context information, not overlapping the first portion of the context information, to the frame stack, and save a value of a link stack pointer to the frame stack.

15. The system of claim 14 further comprising:

if a page address entry corresponding to a link stack memory segment pointed to by the link stack pointer has the stack segment attribute indicator cleared, the processor generates a link stack access exception.

16. The system of claim 15 further comprising:

if the link stack access exception was not generated, the processing unit:

saves a previous frame pointer;

sets up a new frame;

increments the frame pointer;

executes instructions to which program execution was transferred; and upon encountering instructions requesting a transfer to a prior context, restores the requested context.

17. The system of claim 14 wherein the processing unit is further operable to:

if a page address entry corresponding to the link stack having a memory location pointed to by a link stack pointer value has the stack segment attribute set, a stored value from the link stack is loaded as a return address and an incremented link stack pointer value is decremented.

18. The system of claim 17 further comprising:

if a page address entry corresponding to the link stack pointed to by the link stack pointer has the stack segment attribute cleared, the processing unit is further operable to generate a link stack access exception.

19. The system of claim 14 wherein the first portion of the context information includes values of at least a frame pointer and one register value.

20. The system of claim 19 wherein the first portion of the context information includes key context information.

* * * * *

UNITED STATES PATENT AND TRADEMARK OFFICE
CERTIFICATE OF CORRECTION

| | |
|---|---|
| PATENT NO. | : 8,990,546 B2 |
| APPLICATION NO. | : 13/285434 |
| DATED | : March 24, 2015 |
| INVENTOR(S) | : Peter J. Wilson |

It is certified that error appears in the above-identified patent and that said Letters Patent is hereby corrected as shown below:

In the Claims

At column 13, line 12, please change "claim 1" to be --claim 7--

At column 13, line 16, please change "claim 1" to be --claim 7--

Signed and Sealed this
First Day of March, 2016

Michelle K. Lee
*Director of the United States Patent and Trademark Office*